United States Patent
Thomas

(10) Patent No.: US 10,726,069 B2
(45) Date of Patent: Jul. 28, 2020

(54) CLASSIFICATION OF LOG ENTRY TYPES

(71) Applicant: SAP SE, Walldorf (DE)

(72) Inventor: Susan Marie Thomas, Karlsruhe (DE)

(73) Assignee: SAP SE, Walldorf (DE)

( * ) Notice: Subject to any disclaimer, the term of this patent is extended or adjusted under 35 U.S.C. 154(b) by 365 days.

(21) Appl. No.: 15/681,252

(22) Filed: Aug. 18, 2017

(65) Prior Publication Data

US 2019/0057163 A1 Feb. 21, 2019

(51) Int. Cl.
*G06F 16/835* (2019.01)
*G06F 16/28* (2019.01)
*G06F 16/906* (2019.01)
*G06F 11/30* (2006.01)
*G06F 16/93* (2019.01)
*G06F 16/248* (2019.01)

(52) U.S. Cl.
CPC .......... *G06F 16/8373* (2019.01); *G06F 11/30* (2013.01); *G06F 16/248* (2019.01); *G06F 16/285* (2019.01); *G06F 16/906* (2019.01); *G06F 16/93* (2019.01)

(58) Field of Classification Search
CPC .. G06F 16/8373; G06F 16/285; G06F 16/248; G06F 16/93; G06F 16/906; G06F 11/30
USPC ........................................................ 707/726
See application file for complete search history.

(56) References Cited

U.S. PATENT DOCUMENTS

| | | | | |
|---|---|---|---|---|
| 6,144,967 A * | 11/2000 | Nock | ................... | G06F 11/3476 |
| 6,404,743 B1 * | 6/2002 | Meandzija | .......... | H04L 41/0213 |
| | | | | 370/254 |
| 6,526,405 B1 * | 2/2003 | Mannila | ................... | G06K 9/62 |
| | | | | 707/999.004 |
| 6,952,800 B1 * | 10/2005 | Danner | .................... | G10L 15/26 |
| | | | | 715/234 |
| 7,035,925 B1 * | 4/2006 | Nareddy | ................. | H04L 67/22 |
| | | | | 709/224 |
| 7,779,421 B2 * | 8/2010 | Kasravi | ............ | G06Q 10/06316 |
| | | | | 719/318 |
| 8,209,567 B2 * | 6/2012 | Cohen | ................. | G06F 11/3476 |
| | | | | 714/45 |
| 9,501,345 B1 * | 11/2016 | Lietz | .................... | G06F 11/0784 |
| 9,529,568 B1 * | 12/2016 | Karppanen | ............. | G06F 5/065 |
| 9,710,857 B2 * | 7/2017 | Flegel | .................... | G06Q 40/06 |
| 9,773,112 B1 * | 9/2017 | Rathor | .................... | G06F 21/56 |
| 9,870,203 B2 * | 1/2018 | Hermanns | ............. | G06F 16/212 |
| 10,423,638 B2 * | 9/2019 | Taropa | .................. | G06F 16/248 |

(Continued)

FOREIGN PATENT DOCUMENTS

CN 103617280 A * 3/2014

*Primary Examiner* — Phuong Thao Cao
(74) *Attorney, Agent, or Firm* — Fountainhead Law Group P.C.

(57) ABSTRACT

Some embodiments provide a non-transitory machine-readable medium that stores a program. The program receives a log entry instance for creating a definition for a log entry type. The program further generates a markup associated with the log entry instance. The program also generates a document based on the markup associated with the log entry instance. The program further retrieves a set of reference documents. Each reference document is associated with a particular type of event. The program also generates a ranked list of types of events based on the document and the set of reference documents.

17 Claims, 19 Drawing Sheets

(56) References Cited

U.S. PATENT DOCUMENTS

| | | | | |
|---|---|---|---|---|
| 10,467,383 B2* | 11/2019 | Dettinger | | A61B 5/4833 |
| 2003/0163465 A1* | 8/2003 | Morrill | | G06F 16/284 |
| 2004/0225689 A1* | 11/2004 | Dettinger | | G06F 11/0715 |
| 2006/0184529 A1* | 8/2006 | Berg | | G06F 11/0709 |
| 2009/0182760 A1* | 7/2009 | Box | | G06F 16/8373 |
| 2009/0193013 A1* | 7/2009 | Hazlewood | | G06F 16/20 |
| 2010/0287152 A1* | 11/2010 | Hauser | | G06F 16/951 |
| | | | | 707/707 |
| 2012/0032975 A1* | 2/2012 | Koch | | H04L 67/22 |
| | | | | 345/619 |
| 2012/0102056 A1* | 4/2012 | Guirard | | G06F 16/24568 |
| | | | | 707/755 |
| 2012/0130724 A1* | 5/2012 | Flegel | | G06Q 40/06 |
| | | | | 705/1.1 |
| 2012/0251011 A1* | 10/2012 | Gao | | G06F 16/58 |
| | | | | 382/224 |
| 2015/0160814 A1* | 6/2015 | Hermanns | | G06F 16/212 |
| | | | | 715/764 |
| 2015/0212904 A1* | 7/2015 | Scanlon | | G06F 11/1471 |
| | | | | 714/19 |
| 2015/0242431 A1* | 8/2015 | Vlcek | | G06Q 50/01 |
| | | | | 707/753 |
| 2015/0316594 A1* | 11/2015 | Kania | | G01R 21/133 |
| | | | | 702/62 |
| 2015/0347265 A1* | 12/2015 | Clements | | G06F 11/3476 |
| | | | | 714/45 |
| 2015/0370842 A1* | 12/2015 | Gukal | | G06F 16/35 |
| | | | | 707/726 |
| 2016/0019057 A1* | 1/2016 | Bach | | G06F 16/285 |
| | | | | 717/120 |
| 2016/0089606 A1* | 3/2016 | Javed Lal Mohammed Ameerjan | | A63F 13/30 |
| | | | | 463/29 |
| 2016/0103881 A1* | 4/2016 | Gukal | | G06F 16/248 |
| | | | | 707/722 |
| 2016/0350722 A1* | 12/2016 | Walker | | G16H 40/20 |
| 2016/0373293 A1* | 12/2016 | Kushmerick | | H04L 41/0613 |
| 2017/0063762 A1* | 3/2017 | Machol | | H04L 51/18 |
| 2017/0178025 A1* | 6/2017 | Thomas | | G06N 5/025 |
| 2017/0178026 A1* | 6/2017 | Thomas | | G06F 21/552 |
| 2017/0180403 A1* | 6/2017 | Mehta | | H04L 63/1416 |
| 2017/0220664 A1* | 8/2017 | Rulev | | G06F 16/285 |
| 2018/0082120 A1* | 3/2018 | Verdejo | | G06K 9/00577 |
| 2018/0082122 A1* | 3/2018 | Verdejo | | G06K 9/00577 |
| 2018/0165173 A1* | 6/2018 | Lin | | G06F 11/3476 |
| 2018/0314742 A1* | 11/2018 | Taropa | | G06F 16/2474 |
| 2018/0349221 A1* | 12/2018 | Harutyunyan | | G06F 11/0781 |

* cited by examiner

300

<38> Apr 13 07:25:30 host.loc.company.corp sshd[53102]: Invalid user user1 from 10.10.10.10

<<Integer>><Timestamp> <Host> <Syslog> Invalid user <Var> from <IP.IP>
                310            315         320      325                330            335

| Markup Element | Semantic Attribute Names |
|---|---|
| <FilePath> | ResourceName<br>ResourceNamePrior |
| <Host> | NetworkHostnameActor<br>NetworkHostDomainActor<br>NetworkHostnameInitiator<br>NetworkHostDomainInitiator<br>NetworkHostnameTarget<br>NetworkHostDomainTarget<br>NetworkHostnameReporter<br>NetworkHostDomainReporter<br>NetworkHostnameIntermediary<br>NetworkHostDomainIntermediary |
| <IP.IP> | NetworkIPAddressActor<br>NetworkIPAddressInitiator<br>NetworkIPAddressTarget<br>NetworkIPAddressReporter<br>NetworkIPAddressIntermediary |
| <IP.Port> | NetworkPortActor<br>NetworkPortInitiator<br>NetworkPortTarget<br>NetworkPortReporter<br>NetworkPortIntermediary |
| <MAC> | NetworkMACAddressActor<br>NetworkMACAddressInitiator<br>NetworkMACAddressTarget<br>NetworkMACAddressReporter<br>NetworkMACAddressIntermediary |
| <Syslog> | ServiceApplicationName |
| <Timestamp> | Timestamp |
| <Url> | GenericURI |

FIG. 4

A :system_actor log#s_#on a user:user_targeted. Usually the system authenticates the user and creates a session with GenericSessionId:

A system tries to log on a targeted user, but fails. Usually the system authenticates the user and creates a session with GenericSessionId.

| Core Meaning Element | Semantic Attribute Names |
|---|---|
| GenericSessionId: | GenericSessionId |
| :system_actor | SystemIdActor<br>SystemTypeActor<br>NetworkHostnameActor<br>NetworkHostDomainActor<br>NetworkIPAddressActor<br>NetworkPortActor |
| :system_initiator | SystemIdInitiator<br>SystemTypeInitiator<br>NetworkHostnameInitiator<br>NetworkHostDomainInitiator<br>NetworkIPAddressInitiator<br>NetworkPortInitiator |
| :system_intermediary | SystemIdIntermediary<br>SystemTypeIntermediary<br>NetworkHostnameIntermediary<br>NetworkHostDomainIntermediary<br>NetworkIPAddressIntermediary<br>NetworkPortIntermediary |
| :system_reporter | SystemIdReporter<br>SystemTypeReporter<br>NetworkHostnameReporter<br>NetworkHostDomainReporter<br>NetworkIPAddressReporter<br>NetworkPortReporter |
| :system_target | SystemIdTarget<br>SystemTypeTarget<br>NetworkHostnameTarget<br>NetworkHostDomainTarget<br>NetworkIPAddressTarget<br>NetworkPortTarget |
| :user_acting | UserPseudonymActing |
| :user_initiating | UserPseudonymInitiating |
| :user_targeted | UserPseudonymTargeted |
| :user_targeting | UserPseudonymTargeting |

FIG. 7

|    | Semantic Attribute Name |
|----|--------------------------|
| 1  | HeaderId |
| 2  | Timestamp |
| 3  | SystemTypeInitiator |
| 4  | SystemIdInitiator |
| 5  | UserPseudonymInitiating |
| 6  | UserPseudonymTargeting |
| 7  | ServiceTransactionName |
| 8  | ServiceProgramName |
| 9  | EventLogType |
| 10 | TechnicalLogEntryType |
| 11 | NetworkHostnameActor |
| 12 | TechnicalGroupId |
| 13 | ServiceInstanceName |
| 14 | Event |
| 15 | UserPseudonymTargeted |
| 16 | TechnicalNumber |
| 17 | TechnicalNumberRange |
| 18 | TechnicalTimestampOfInsertion |
| 19 | AttackName |
| 20 | AttackType |
| 21 | CorrelationId |
| 22 | SystemTypeTarget |
| 23 | SystemIdTarget |
| 24 | CorrelationSubId |
| 25 | EventName |
| 26 | EventScenarioRoleOfActor |
| 27 | EventScenarioRoleOfInitiator |
| 28 | EventSeverityCode |
| 29 | EventSourceId |
| 30 | EventSourceType |
| 31 | GenericAction |
| 32 | GenericCategory |
| 33 | GenericDeviceType |
| 34 | GenericExplanation |
| 35 | GenericGeolocationCodeActor |

- HeaderId
- Timestamp
- ServiceProgramName
- TechnicalLogEntryType
- NetworkHostnameActor
- ServiceInstanceName
- Event
- UserPseudonymTargeted
- TechnicalTimestampOfInsertion
- EventName
- EventSeverityCode
- GenericCategory
- GenericExplanation
- logon
- failed

FIG. 11

| | Log Entry Instance Value |
|---|---|
| 1 | Q29tYrBIZwPRrpeqrE0FAA== |
| 2 | Thu Apr 27 2017 16:14:02 GMT+0200 (W. Europe Daylight Time) |
| 3 | |
| 4 | |
| 5 | |
| 6 | |
| 7 | |
| 8 | SAPMSSY1 |
| 9 | SecurityAuditLog |
| 10 | SM20_AU6 |
| 11 | vml2242 |
| 12 | |
| 13 | ldciui3_UI3_32 |
| 14 | AU6 |
| 15 | SAP* |
| 16 | |
| 17 | |
| 18 | Thu Apr 27 2017 16:14:04 GMT+0200 (W. Europe Daylight Time) |
| 19 | |
| 20 | |
| 21 | |
| 22 | |
| 23 | |
| 24 | |
| 25 | User Logon Failure |
| 26 | |
| 27 | |
| 28 | 9 |
| 29 | 10.66.49.235 |
| 30 | IP Address |
| 31 | |
| 32 | |
| 33 | |
| 34 | |
| 35 | |

1300

| | Log Entry Instance Value |
|---|---|
| 1 | Q29tYuRIZwPRrpeqrE0FAA== |
| 2 | Thu Apr 27 2017 16:14:00 GMT+0200 (W. Europe Daylight Time) |
| 3 | |
| 4 | |
| 5 | UCNEA-8353 |
| 6 | |
| 7 | |
| 8 | |
| 9 | Audit Trail |
| 10 | HDB_U_CONNECT |
| 11 | ld2429 |
| 12 | |
| 13 | ld2429.wdf.sap.corp_00 |
| 14 | CONNECT |
| 15 | CNDQW-79109 |
| 16 | |
| 17 | |
| 18 | Thu Apr 27 2017 16:14:04 GMT+0200 (W. Europe Daylight Time) |
| 19 | |
| 20 | |
| 21 | |
| 22 | |
| 23 | |
| 24 | |
| 25 | User Logon Failure |
| 26 | |
| 27 | |
| 28 | INFO |
| 29 | ld2429.wdf.sap.corp_00 |
| 30 | HDB |
| 31 | CONNECT |
| 32 | |
| 33 | |
| 34 | |
| 35 | |

FIG. 14

CLASSIFICATION OF LOG ENTRY TYPES

BACKGROUND

Many modern computing devices and/or software operating on such devices may be configured to generate logs that described events occurring during the operation of the computing devices and/or software. Such logs can include any number of different information in any number of different formats. For example, log entries can include a timestamp, information about the state of the computing device and/or software (e.g., the amount of resources being consumed), an error message, the source of the error, the severity of the error, etc. Logs have many uses. For instance, logs may be used to determine malfunctions and bugs in computing devices and/or software. Logs can also be analyzed to improve the operation of computing devices and/or software, provide statistics regarding the operation of computing devices, provide information about behaviors of users of computing devices and/or software, etc.

SUMMARY

In some embodiments, a non-transitory machine-readable medium stores a program. The program receives a log entry instance for creating a definition for a log entry type. The program further generates a markup associated with the log entry instance. The program also generates a document based on the markup associated with the log entry instance. The program further retrieves a set of reference documents. Each reference document is associated with a particular type of event. The program also generates a ranked list of types of events based on the document and the set of reference documents.

In some embodiments, the program may further present the ranked list of types of events. The program may also receive a selection of a type of event from the ranked list of types of events. The program may further create the definition for the log entry type by associating the selected type of event with the definition for the log entry type. The log entry instance may be a first log entry instance. The program may further receive a second log entry instance from a monitored source. The program may also process the second log entry instance based on the definition for the log entry type in order to determine whether the second log entry instance is a log entry instance having the log entry type.

In some embodiments, the program may further generate a subset of the set of reference documents based on a set of definitions of types of events. The program may also generate a subset of the set of reference documents based on a set of log entry instances. The markup associated with the log entry instance may include a set of markup elements. The document may include a set of semantic attribute names. Generating the document based on the markup associated with the log entry instance may include identifying the set of semantic attribute names based on a mapping between a plurality of markup elements and a plurality of semantic attribute names. Generating a ranked list of types of events based on the document and the set of reference documents may include determining similarities between the document and each of the reference documents in the set of reference documents.

In some embodiments, a method receives a log entry instance for creating a definition for a log entry type. The method further generates a markup associated with the log entry instance. The method also generates a document based on the markup associated with the log entry instance. The method further retrieves a set of reference documents. Each reference document is associated with a particular type of event. The method also generates a ranked list of types of events based on the document and the set of reference documents.

In some embodiments, the method may further presenting the ranked list of types of events. The method may also receive a selection of a type of event from the ranked list of types of events. The method may further create the definition for the log entry type by associating the selected type of event with the definition for the log entry type. The log entry instance may be a first log entry instance. The method may further receive a second log entry instance from a monitored source. The method may also process the second log entry instance based on the definition for the log entry type in order to determine whether the second log entry instance is a log entry instance having the log entry type.

In some embodiments, the method may further generate a subset of the set of reference documents based on a set of definitions of types of events. The method may also generate a subset of the set of reference documents based on a set of log entry instances. The markup associated with the log entry instance may include a set of markup elements. The document may include a set of semantic attribute names. Generating the document based on the markup associated with the log entry instance may include identifying the set of semantic attribute names based on a mapping between a plurality of markup elements and a plurality of semantic attribute names. Generating a ranked list of types of events based on the document and the set of reference documents may include determining similarities between the document and each of the reference documents in the set of reference documents.

In some embodiments, a system includes a set of processing units and a non-transitory computer-readable medium that stores instructions. The instructions cause at least one processing unit to receive a log entry instance for creating a definition for a log entry type. The instructions further cause the at least one processing unit to generate a markup associated with the log entry instance. The instructions also cause the at least one processing unit to generate a document based on the markup associated with the log entry instance. The instructions further cause the at least one processing unit to retrieve a set of reference documents, each reference document associated with a particular type of event. The instructions also cause the at least one processing unit to generate a ranked list of types of events based on the document and the set of reference documents.

In some embodiments, the instructions may further cause the at least one processing unit to present the ranked list of types of events. The instructions may also cause the at least one processing unit to receive a selection of a type of event from the ranked list of types of events. The instructions may further cause the at least one processing unit to create the definition for the log entry type by associating the selected type of event with the definition for the log entry type. The log entry instance may be a first log entry instance. The instructions may further cause the at least one processing unit to receive a second log entry instance from a monitored source. The instructions may also cause the at least one processing unit to process the second log entry instance based on the definition for the log entry type in order to determine whether the second log entry instance is a log entry instance having the log entry type.

In some embodiments, the instructions may further cause the at least one processing unit to generate a subset of the set of reference documents based on a set of definitions of types of events. The instructions may also cause the at least one processing unit to generate a subset of the set of reference documents based on a set of log entry instances. The markup associated with the log entry instance may include a set of markup elements. The document may include a set of semantic attribute names. Generating the document based on the markup associated with the log entry instance may include identifying the set of semantic attribute names based on a mapping between a plurality of markup elements and a plurality of semantic attribute names.

The following detailed description and accompanying drawings provide a better understanding of the nature and advantages of the present invention.

BRIEF DESCRIPTION OF THE DRAWINGS

FIGS. 3A and 3B illustrate an example log entry instance and a markup associated with the example log entry instance according to some embodiments.

FIG. 4 illustrates an example mapping between markup elements and semantic attribute names according to some embodiments.

FIG. 7 illustrates an example mapping between core meaning elements and semantic attribute names according to some embodiments.

FIG. 9 illustrates an example configuration for a normalized log entry instance according to some embodiments.

FIG. 11 illustrates a reference document generated based on the log entry instance illustrated in FIG. 10 according to some embodiments.

FIG. 14 illustrates another example normalized log entry instance according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for classifying log entry types. In some embodiments, a system is configured to determine the types of events associated with log entries that the system receives from other systems. The system may use different log entry type definitions to determine a type of event associated with a particular log entry. Each log entry type definition includes a set of rules and specifies a particular type of event with which the log entry type is associated. In some embodiments, the system includes a tool for creating a new log entry type definition. Such a tool can automatically provide a list of candidate types of events that are likely associated with the new log entry type. A type of event may be selected from the list of candidate types of events and then used in the definition of the log entry type to specify the type of event with which the log entry type is associated. Once the log entry type definition is created, it may be used by the system in determining the types of events associated with log entries that the system receives from other systems.

Figure 1:
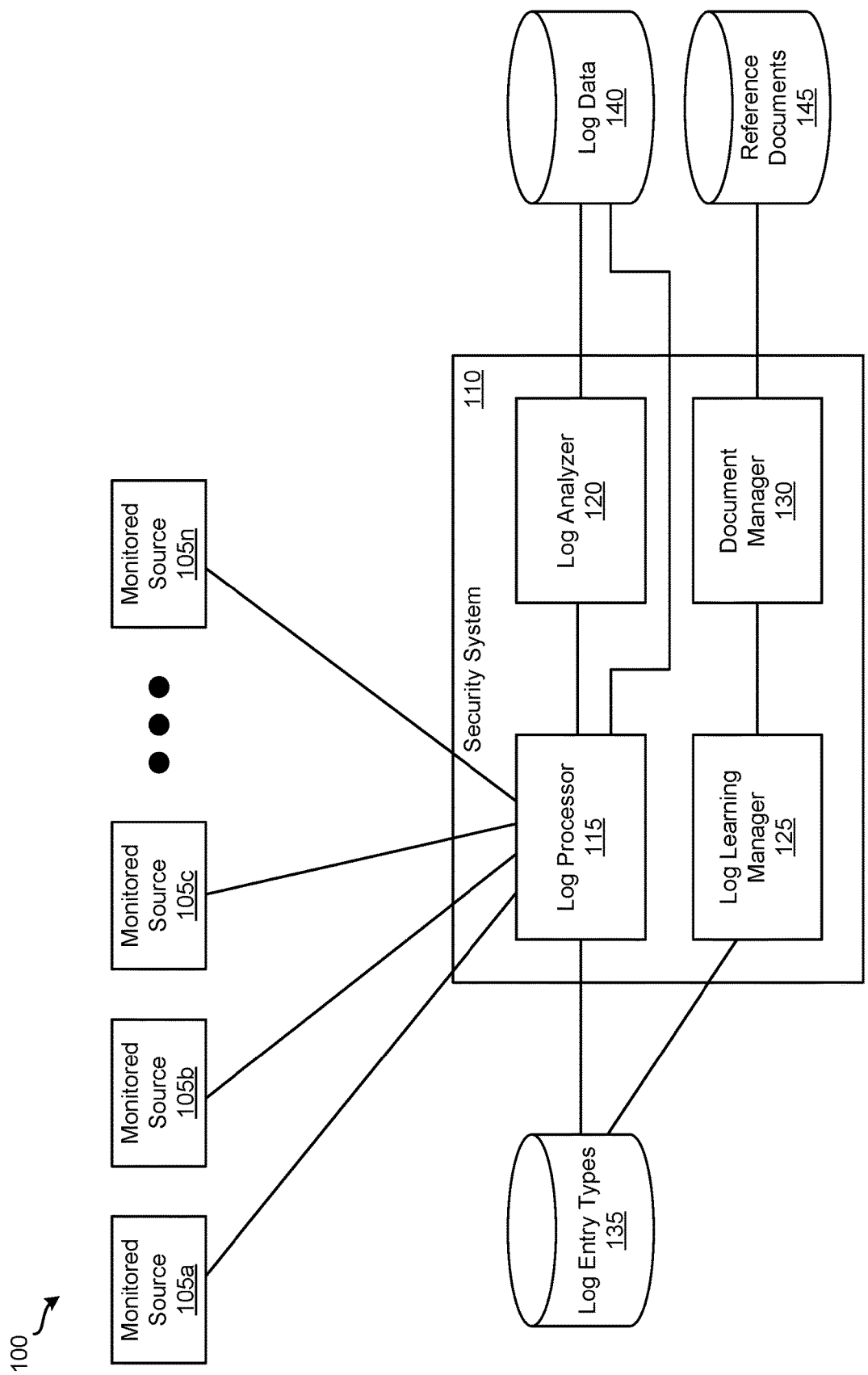
FIG. 1 illustrates a system for classifying log entry types according to some embodiments.

FIG. 1 illustrates system 100 for classifying log entry types according to some embodiments. As shown, system 100 includes monitored sources 105a-105n, security system 110, and storages 135-145. Log entry types storage 135 can be configured to store log entry type definition. As mentioned above, a log entry type definition can include a set of rules and can specify a particular type of event with which the log entry type is associated. Log data storage 140 may store log data generated by monitored sources 105a-105n and processed by log processor 115. Reference documents storage 145 is configured to store reference documents managed by document manager 130. Storages 135-145 may be relational databases, non-relational databases, or a combination thereof. In some embodiments, storages 135-145 are implemented in a single physical storage while, in other embodiments, one or more storages 135-145 may be implemented across several physical storages. While FIG. 1 shows storages 135-145 as external to security system 110, one of ordinary skill in the art will appreciate that one or more of storages 135-145 may be part of system 110 in some embodiments. In addition, one or more of storages 135-145 may be external to system 100 in some such embodiments.

Monitored sources 105a-105n are configured to generate log entries (also referred to as log entry instance) and to send the log entries to security system 110 for processing. In some embodiments, a log entry may be a structured message generated by a monitored source 105 that describes an event. Examples of structures include text with embedded variables, a list of variables separated by punctuation such as commas or semi-colons, a list of key-value pairs, a hierarchic structure like JSON, or any combination thereof. Examples of events include actions, errors, or states associated with the monitored source. In some embodiments, a log entry is text-based. In some instances, a log entry may be human-readable. In other instances, a log entry includes non-textual codes that are decoded before they can be interpreted. In some embodiments, monitored sources 105a-105n can be configured to send log entries at the same or different intervals. For example, monitored source 105a and 105c may send log entries to security system 110 once an hour while remaining monitored sources 105 may send log entries to security system 110 once a day. In other instances, monitored sources 105a-105n can be configured to send log entries in real-time. That is, monitored sources 105a-105n sends log entries to security system 110 as they are generated. Each monitored source 105 may be a computing device, an application operating on a computing device, a networking device, a peripheral device (e.g., a printer), a mobile device, a wearable device, etc., or a combination thereof.

As illustrated in FIG. 1, security system 110 includes log processor 115, log analyzer 120, log learning manager 125, and document manager 130. Log processor 115 is responsible for processing log entry instances received from monitored sources 105a-105n. For example, when log processor 115 receives a log entry instance from a monitored source 105, log processor 115 uses the log entry type definitions stored in log entry types storage 135 to determine a type of event associated with the log entry instance and stores the log entry instance and the associated type of event in log data storage 140. In some embodiments, log processor 115 sends the log entry instance and associated type of event to log analyzer 120 for storage in log data storage 140. In other embodiments log processor 115 stores the log entry instance the associated type of event directly in log data storage 140. Log processor 115 may perform other operations before storing the log entry instance. For instance, log processor 115 may parse the log entry instance to extract variables and store them in normalized attributes. Log processor 115 may pseudonymize user data and/or other sensitive data. In some instances, log processor 115 may also enrich information from the log entry instance. For example, log processor 115 can add the subnetwork in which an extracted IP address is located, add the identification of the domain that can resolve a username to a person, etc. Log processor 115 may also map username-domain pairs to persons before creating pseudonyms, so that a person has only one pseudonym, and not one for each username-domain pair.

Log analyzer 120 may monitor and analyze log data stored in log data storage 140. For instance, log analyzer 120 may correlate logs stored in log data storage 140. Log analyzer 120 can also analyze the log data to detect security attacks on monitored sources 105a-105n and evaluate attack detection patterns. In some instances, log analyzer 120 may generate alerts in response to analyzing the log data. In some embodiments, log analyzer 120 can provide graphical presentation of the analyzed log data and/or statistics associated with the log data. Log analyzer 120 may provide a tool for investigating potential security attacks on monitored sources 105a-105n Log learning manager 125 is configured to provide a tool for creating new log entry type definitions. In some embodiments, log learning manager 125 provides the tool via a graphical user interface (GUI) displayed on a computing device (not shown) of a user of security system 110. When creating a log entry type definition, log learning manager 125 allows a user of the tool to select a type of event associated with the log entry type. Once a log entry type definition is created, log learning manager 125 generates a set of rules for identifying log entry instances having the specified log entry type and stores the set of rule as part of the log entry type definition in log entry types storage 135. This way, log processor 115 may use the newly created log entry type definition to processing log entry instances that log processor 115 receives from monitored sources 105a-105n.

Document manager 130 is configured to manage reference documents. For instance, document manager 130 may generate reference documents from a number of different sources and store the generated reference documents in reference documents storage 145. In some embodiments, document manager 130 may receive requests from log learning manager 125 to provide ranked lists of types of events. For example, document manager 130 can receive such a request along with a document that includes a set of semantic attribute names generated from a log entry instance. In response, document manager 130 retrieves reference documents from reference documents storage 145 and, based on the received document and retrieved reference documents, determine a ranked list of types of events. Then, document manager 130 sends the ranked list of types of events to log learning manager 125.

Figure 2:
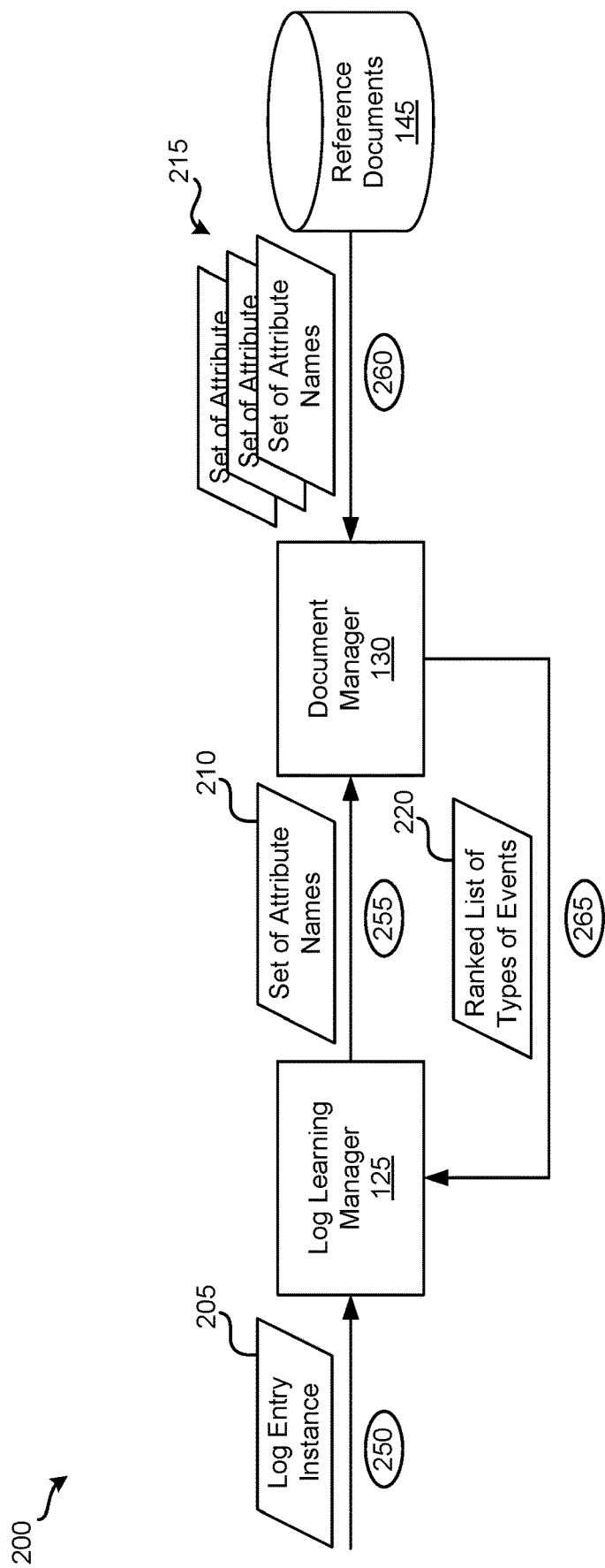
FIG. 2 illustrates an example dataflow through the system illustrated in FIG. 1 according to some embodiments.

An example log entry type definition creation operation will now be described by reference to FIGS. 2-15. FIG. 2 illustrates an example dataflow 200 through system 100 according to some embodiments. In particular, dataflow 200 is an example dataflow for creating a log entry type definition. Dataflow 200 includes log entry instance 205, document 210, reference documents 215, ranked list of types of events 220, log learning manager 125, document manager 130, and reference documents storage 145. As shown, log learning manager 125 receives, at operation 250, log entry instance 205. In some embodiments, log learning manager 125 receives log entry instance 205 from a computing device of a user of security system 110 via a GUI through which log learning manager 125 provides the tool for creating log entry type definitions. Log entry instance 205 is a log entry instance of the log entry type for which the log entry type definition is being created. Once log learning manager 125 receives log entry instance 205, log learning manager 125 generates a markup of log entry instance 205. In some embodiments, log learning manager 125 generates the markup of log entry instance 205 by finding variables in log entry instance 205 based on patterns. For example, a sequence of letters and digits that includes at least one digit may be considered a variable. Sequences of letters without any digits may be considered to be words and, thus, are not variables. In some embodiments, a markup of a log entry instance is a genericized representation of the structure of the log entry instance.

FIGS. 3A and 3B illustrate an example log entry instance and a markup associated with the example log entry instance according to some embodiments. In particular, FIG. 3A illustrates log entry instance 300, which includes a string of text. In this example, log entry instance 300 is generated by a monitored source 105 and the text of log entry instance 300 describes an event that occurred on the monitored source 105. FIG. 3B illustrates markup 305, which is generated from, and associated with, log entry instance 300. As shown, markup 305 includes markup elements 310-335. Markup element 310 represents an integer element, markup element 315 represents a timestamp element, markup element 320 represents a host element, markup element 325 system log element, markup element 330 is a variable element, and markup element 335 is an Internet Protocol (IP) address element.

Returning to FIG. 2, after generating a markup for a log entry instance, log learning manage 125 generates a document that includes a set of semantic attribute names based on the markup of the log entry instance. In some embodiments, log learning manager 125 generates such a document based on a mapping between markup elements and semantic attribute names. FIG. 4 illustrates an example mapping 400 between markup elements and semantic attribute names according to some embodiments. As shown in FIG. 4, markup element <FilePath> is mapped to semantic attribute names ResoureName and ResourceNamePrior. Markup element <Host> is mapped to semantic attribute names NetworkHostnameActor, NetworkHostDomainActor, NetworkHostnameInitiator, NetworkHostDomainInitiator, NetworkHostnameTarget, NetworkHostDomainTarget, NetworkHostnameReporter, NetworkHostDomainReporter, NetworkHostnameIntermediary, and NetworkHostDomainIntermediary. Markup element <IP.IP> is mapped to semantic attribute names NetworkIPAddressActor, NetworkIPAddressInitiator, NetworkIPAddressTarget, NetworkIPAddressReporter, and NetworkIPAddressIntermediary. Markup element <IP.Port> is mapped to semantic attribute names NetworkPortActor, NetworkPortInitiator, NetworkPortTarget, NetworkPortReporter, and NetworkPortIntermediary. Markup element <MAC> is mapped to semantic attribute names NetworkMACAddressActor, NetworkMACAddressInitiator, NetworkMACAddressTarget, NetworkMACAddressReporter, and NetworkMACAddressIntermediary. Markup element <Syslog> is mapped to semantic attribute name ServiceApplicationName. Markup element <Timestamp> is mapped to semantic attribute name Timestamp. Finally, markup element <Url> is mapped to semantic attribute name GenericURI.

Figure 5:
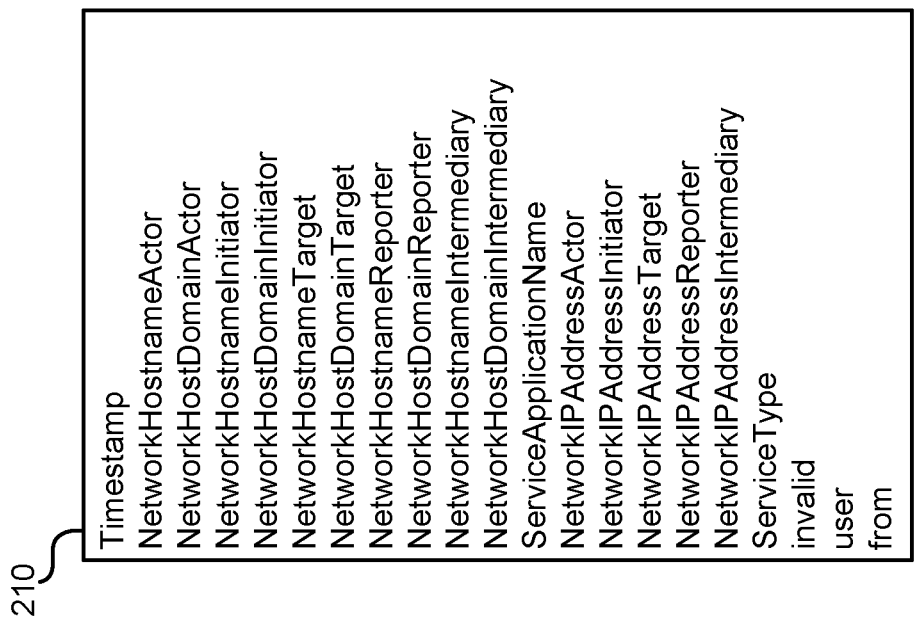
FIG. 5 illustrates an example document generated based on a log entry instance according to some embodiments.

FIG. 5 illustrates an example document generated based on a log entry instance according to some embodiments. Specifically, document 210 is generated in this example based on markup 305 and mappings 400. For this example, log learning manager 125 generates document 210 by iterating through each of the markup elements in markup 305, identifying semantic attribute names mapped to each of the markup elements based on mappings 400, and including the identified semantic attribute names in document 210. In addition, log learning manager 125 includes in document 210 words in markup 305 that are not markup elements. In this example, the words in markup 305 are "invalid," "user," and "from." In some embodiments, log learning manager 125 adds a set of default words in each document generated based on a log entry instance. For this example, "ServiceType" is the set of default words. As such, log learning manager 125 includes this word in document 210.

Returning to FIG. 2, upon generating document 210, log learning manager 125 sends, at operation 255, document manager 130 a request for a ranked list of types of events along with document 210. When document manager 130 receives the request and document 210, document manager 130 retrieves, at operation 260, reference documents 215 from reference documents storage 145. A reference document can include a set of semantic attribute names. In some embodiments, reference documents stored on reference documents storage 145 are generated by document manager 130. Document manager 130 may generate such reference documents from several different sources. For instance, document manager 130 may generate a reference document from a definition of a type of event. In some embodiments, a definition of a type of event specifies a core meaning and an outcome. A core meaning of a type of event may be a markup of a string (e.g., a sentence) that provides a meaning for the type of event. An outcome of a type of event may represent the outcome of the action of the type of event.

Figure 6A:
FIGS. 6A and 6B illustrate an example core meaning and a description associated with the core meaning according to some embodiments.
Figure 6B:
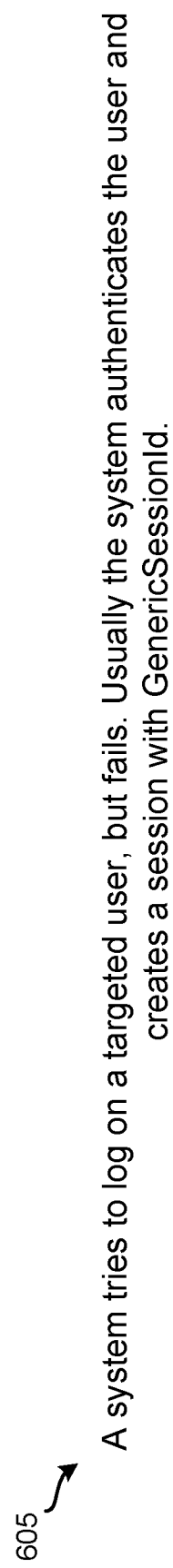

FIGS. 6A and 6B illustrate an example core meaning 600 and description 605 associated with core meaning 600 according to some embodiments. Specifically, FIG. 6A illustrates core meaning 600. For this example, core meaning 600 is a core meaning for a failed user logon type of event. In addition, the outcome specified for this type of event is "failure." As shown, core meaning 600 includes core meaning elements 610-620. Different embodiments use different markups for core meanings. In this example, a "#" is placed at the end of a verb and before a conjugation ending or "ing" if present. A "#" is placed at the front of a preposition (e.g., "on") in order to identify components of verb phrases and prepositional verbs whose meaning is incomplete without the preposition. A ":" may be placed at the front of role or type and at the end of a type of entity that plays the role or has the type. A "!" can be used to specify three levels of a modifier type hierarchy (e.g., "as_callback-!action_modifier!modifier"). A "_" may be used to group multi-word strings, entities, or complex verbs. A "|" can mark the end of predicates for a type of event. After the "|", entity hierarchy elements like <entity>:<entity> and semantic attribute names may be processed. A "@" may mark a conjunction that specifies the relation between two predicates (e.g., "@while").

In some embodiments, the ":" may be used to separate an entity type from either another higher-level entity type or a role. A role can specify the higher-level type of entity that plays the role and the role it plays. The entity type may be the first element of the role before the "_" and the role follows the "_". Examples of forms that involve a ":" include <entity>:<entity>, <entity>:<entity>:<entity>, <entity>:<role>, and :<role>. The <entity>:<entity> form specifies that the second entity is a superclass of the second. The form <entity>:<entity>:<entity> specifies that the second entity is a superclass of the second and specifies a class-hierarchy level. The <entity>:<role> form includes the superclass of the entity and its role in the action. The <role> form specifies that he superclass inside <role> itself plays the role. The possible roles can be separated into system roles, user roles, and trigger roles. Examples of system roles include system_actor, system_initiator, system_target, system_reporter, and system_intermediary. Examples of user roles include user_acting, user_initiating, user_targeting, and user_targeted. Example of trigger roles include trigger_acting and trigger_targeted. In some embodiments, when the role occurs without a type in front (e.g., ":<role>"), the type of entity that plays the role is the part of the role name before the underscore. As an example, ":user_targeted" is the same as "user:user_targeted". FIG. 6B illustrates description 605, which is associated with core meaning 600. In some embodiments, a description associated with a core meaning is a string that document manager 130 derives from the core meaning. As shown, description 605 includes the outcome specified for the type of event and, unlike core meaning 600, description 605 does not include any markups.

In some embodiments, document manager 130 may generate a reference document from a definition of a type of event based on a mapping between core meaning elements and semantic attribute names. FIG. 7 illustrates an example mapping 700 between core meaning elements and semantic attribute names according to some embodiments. As illustrated in FIG. 7, core meaning element GenericSessionId: is mapped to semantic attribute name GenericSessionId. Core meaning element :system_actor is mapped to semantic attribute names SystemIdActor, SystemTypeActor, NetworkHostnameActor, NetworkHostDomainActor, NetworkIPAddressActor, and NetworkPortActor. Core meaning element :system_initiator is mapped to semantic attribute names SystemIdInitiator, SystemTypeInitiator, NetworkHostnameInitiator, NetworkHostDomainInitiator, NetworkIPAddressInitiator, and NetworkPortInitiator. Core meaning element :system_intermediary is mapped to semantic attribute names SystemIdIntermediary, SystemTypeIntermediary, NetworkHostnameIntermediary, NetworkHostDomainIntermediary, NetworkIPAddressIntermediary, and NetworkPortIntermediary. Core meaning element :system_reporter is mapped to semantic attribute names SystemIdReporter, SystemTypeReporter, NetworkHostnameReporter, NetworkHostDomainReporter, NetworkIPAddressReporter, and NetworkPortReporter. Core meaning element :system_target is mapped to semantic attribute name SystemIdTarget, SystemTypeTarget, NetworkHostnameTarget, NetworkHostDomainTarget, NetworkIPAddressTarget, and NetworkPortTarget. Core meaning element :user_acting is mapped to semantic attribute name UserPseudonymActing. Core meaning element :user_initiating is mapped to semantic attribute name UserPseudonymInitiating. Core meaning element :user_targeted is mapped to semantic attribute name UserPseudonymTargeted. Lastly, core meaning element :user_targeting is mapped to semantic attribute name UserPseudonymTargeting.

Figure 8:
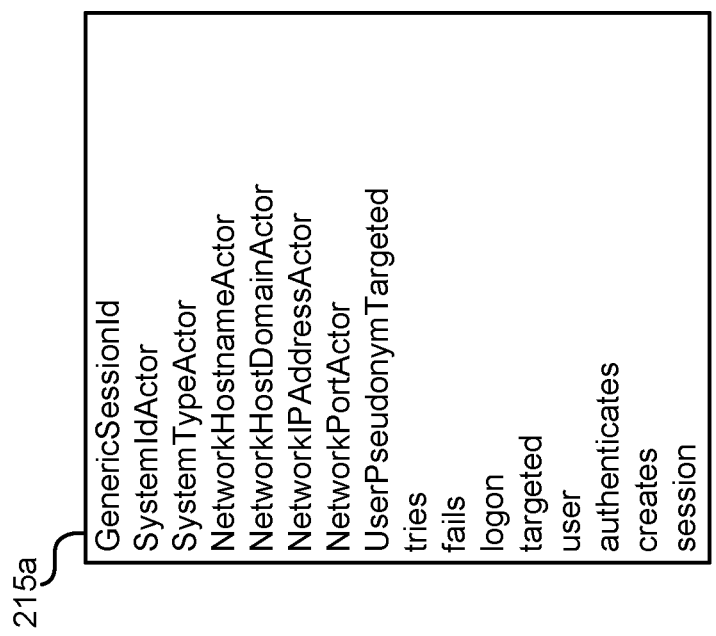
FIG. 8 illustrates a reference document generated based on a definition of a type of event according to some embodiments.

FIG. 8 illustrates a reference document 215a generated based on a definition of a type of event according to some embodiments. In particular, reference document 215a is generated for this example based on core meaning 600, description 605, and mappings 700. In this example, document manager 130 generates reference document 215a by iterating through each of the core meaning elements in core meaning 600, identifying semantic attribute names mapped to each of the core meaning elements, and including the identified semantic attribute names in reference document 215a. As shown, document manager 130 includes the semantic attribute names GenericSessionId, SystemIdActor, SystemTypeActor, NetworkHostnameActor, NetworkHostDomainActor, NetworkIPAddressActor, NetworkPortActor, and UserPseudonymTargeted in reference document 215a based on core meaning 600 and mappings 700. Also, document manager 130 includes in reference document 215a certain words in description 605. In some embodiments, document manager 130 determines the words in description 605 to include in reference document 215a based on a list of unimportant words (e.g., "a", "the", "system", "but", "usually", "to", "on", "with", words not belonging to a language, etc.). If a particular word in description 605 is included in the list of unimportant words, document manager 130 does not include it in reference document 215a. Otherwise, document manager 130 includes the word in reference document 215a. In some such embodiments, document manager 130 transforms certain words in description 605 to a standardized format. For instance, in this example, document manager 130 transforms the word "log on" to "logon". In this example, the words in description 600 that are included in reference document 215a are "tries," "fails," "logon," "targeted," "user," "authenticates," "creates," and "session." A document generated based on a definition of a type of event may be associated with the type of event. As such, reference document 215a is associated with a failed user logon type of event.

Document manager 130 may also generate reference documents from log entry instances processed by log processor 115 and stored in log data storage 140. As mentioned above, log processor 115 may normalize a log entry instance as part of the processing of the log entry instance. In some embodiments, log processor 115 normalizes a log entry instance by organizing the data according to a particular configuration based on attribute values in the log entry instance associated with semantic name attributes. FIG. 9 illustrates an example configuration 900 for a normalized log entry instance according to some embodiments. As shown, configuration 900 includes thirty five semantic attribute names and specifies an order for the thirty five semantic attribute names.

Figure 10:
FIG. 10 illustrates an example normalized log entry instance according to some embodiments.

FIG. 10 illustrates an example normalized log entry instance 1000 according to some embodiments. Specifically, log entry instance 1000 is normalized according to configuration 900. In this example, log entry instance 1000 is a log entry type associated with a failed user logon type of event. As shown, log entry instance 1000 includes non-null values for a subset of the corresponding thirty five semantic attribute names in configuration 900. For this example, log entry instance 1000 includes non-null values for the HeaderId, Timestamp, ServiceProgramName, EventLogType, TechnicalLogEntryType, NetworkHostnameActor, ServiceInstanceName, Event, UserPseudonymTargeted, TechnicalTimestampOfInsertion, EventName, EventSeverityCode, EventSourceId, EventSourceType, GenericCategory, and GenericExplanation semantic attribute names.

FIG. 11 illustrates a reference document 215b generated based on the log entry instance illustrated in FIG. 10 according to some embodiments. In particular, reference document 215b is generated based on configuration 900 and log entry instance 1000. In this example, document manager 130 generates reference document 215b by determining the non-null values in log entry instance 1000, identifying semantic attribute names in configuration 900 that correspond to the identified non-null values in log entry instance 1000, and including the identified semantic attribute names in reference document 215b. In some embodiments, document manager 130 does not include in a document certain semantic attribute names in configuration 900 even if a log entry instance has non-null values for those semantic attribute names. For this example, document manager 130 does not include the semantic attribute names EventLogType, EventSourceId, and EventSourceType in reference document 215b. As shown, document manager 130 includes in reference document 215b the following semantic attribute names associated with non-null values in log entry instance 1000: HeaderId, Timestamp, ServiceProgramName, TechnicalLogEntryType, NetworkHostnameActor, ServiceInstanceName, Event, UserPseudonymTargeted, TechnicalTimestampOfInsertion, EventName, EventSeverityCode, GenericCategory, and GenericExplanation. In addition, document manager 130 may include values or partial values of a log entry instance associated with certain semantic attribute names. For instance, for a semantic attribute name that includes text-based values, document manager 130 can include certain words in the value associated with the semantic attribute name. As an example, document manager 130 may include certain words in the value associated with the GenericExplanation semantic attribute name (i.e., semantic attribute name 34 in configuration 900) as it can contain text-based values. In some embodiments, document manager 130 determines the words in the value associated with the GenericExplanation semantic attribute name to include in reference document 215b based on a list of unimportant words (e.g., "a", "the", "system", "but", "usually", "to", "on", "with", words not belonging to a language, etc.). If a particular word in description 605 is included in the list of unimportant words, document manager 130 does not include it in reference document 215b. Otherwise, document manager 130 includes the word in reference document 215b. For this example, document manager 130 includes the words "logon" and "failed," which are words in the string value associated with the GenericExplanation semantic attribute name and not in the list of unimportant words, in reference document 215b, as illustrated in FIG. 11.

A document generated based on a log entry instance may be associated with the type of event with which the log entry instance is associated. Thus, reference document 215b is associated with a failed user logon type of event since log entry instance 1000 is a log entry type associated with the failed user logon type of event.

Figure 12:
FIG. 12 illustrates another example normalized log entry instance according to some embodiments.

Different log entry types may be defined to be associated with the same type of event. In some embodiments, log entry instances of different log entry types defined to be associated with the same type of event may have values for different subsets of semantic attribute names. FIG. 12 illustrates another example normalized log entry 1200 instance according to some embodiments. In particular, log entry instance 1200 is normalized according to configuration 900. For this example, log entry instance 1200 is another log entry type associated with a failed user logon type of event. As illustrated, log entry instance 1200 includes non-null values for a subset of the corresponding thirty five semantic attribute names in configuration 900. In this example, log entry instance 1200 includes non-null values for the HeaderId, Timestamp, ServiceProgramName, EventLogType, TechnicalLogEntryType, NetworkHostnameActor, ServiceInstanceName, Event, UserPseudonymTargeted, TechnicalTimestampOfInsertion, EventName, EventSeverityCode, EventSourceId, and EventSourceType semantic attribute names.

Figure 13:
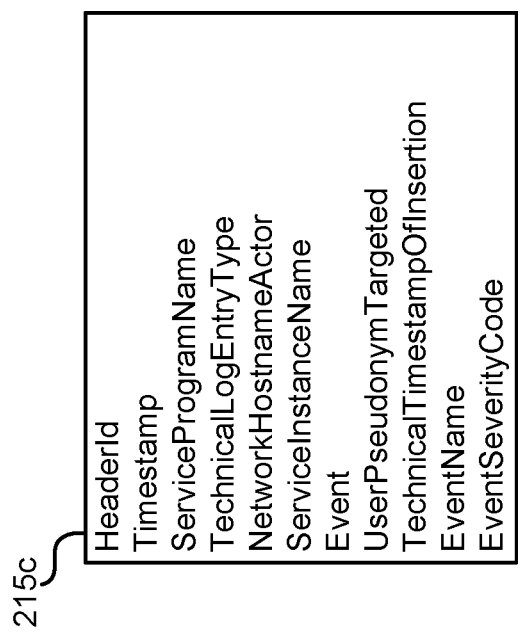
FIG. 13 illustrates a reference document generated based on the log entry instance illustrated in FIG. 12 according to some embodiments.

FIG. 13 illustrates a reference document 215c generated based on the log entry instance illustrated in FIG. 12 according to some embodiments. Specifically, reference document 215c is generated based on configuration 900 and log entry instance 1200. For this example, document manager 130 generates reference document 215c by determining the non-null values in log entry instance 1200, identifying semantic attribute names in configuration 900 that correspond to the identified non-null values in log entry instance 1200, and including the identified semantic attribute names in reference document 215c. As explained above, document manager 130 does not include in a document certain semantic attribute names in configuration 900 even if a log entry instance has non-null values for those semantic attribute names. In this example, document manager 130 does not include the semantic attribute names EventLogType, EventSourceId, and EventSourceType in reference document 215c. As illustrated, document manager 130 includes in reference document 215c the following semantic attribute names associated with non-null values in log entry instance 1200: HeaderId, Timestamp, ServiceProgramName, TechnicalLogEntryType, NetworkHostnameActor, ServiceInstanceName, Event, UserPseudonymTargeted, TechnicalTimestampOfInsertion, EventName, and EventSeverityCode. In this example, the value associated with GenericExplanation semantic attribute name in log entry instance 1200 is null. As such, document manager 130 does not include values or partial values associated with this semantic attribute name in reference document 215c. As mentioned above, a document generated based on a log entry instance may be associated with the type of event with which the log entry instance is associated. Thus, reference document 215c is associated with a failed user logon type of event since log entry instance 1200 is a log entry type associated with the failed user logon type of event.

FIG. 14 illustrates another example normalized log 1400 entry instance according to some embodiments. Specifically, log entry instance 1400 is normalized according to configuration 900. In this example, log entry instance 1400 is yet another log entry type associated with a failed user logon type of event. As shown, log entry instance 1400 includes non-null values for a subset of the corresponding thirty five semantic attribute names in configuration 900. In this example, log entry instance 1400 includes non-null values for the HeaderId, Timestamp, UserPseudonymInitiating, EventLogType, TechnicalLogEntryType, NetworkHostnameActor, ServiceInstanceName, Event, UserPseudonymTargeted, TechnicalTimestampOfInsertion, EventName, EventSeverityCode, EventSourceId, EventSourceType, and GenericAction semantic attribute names.

Figure 15:
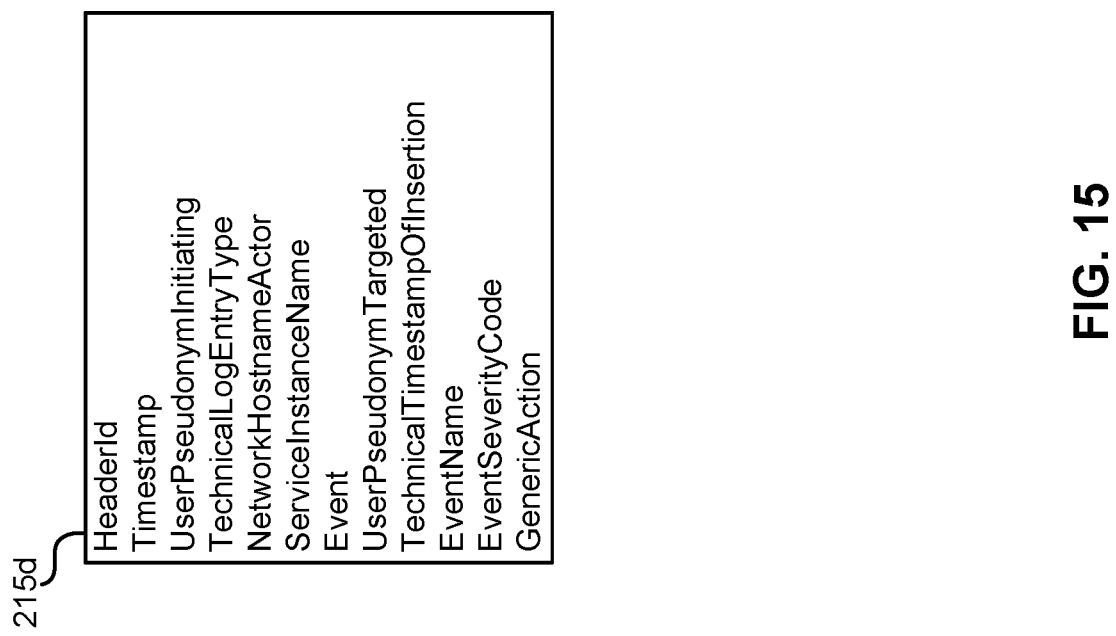
FIG. 15 illustrates a reference document generated based on the log entry instance illustrated in FIG. 14 according to some embodiments.

FIG. 15 illustrates a reference document 215d generated based on the log entry instance illustrated in FIG. 14 according to some embodiments. In particular, reference document 215d is generated based on configuration 900 and log entry instance 1400. In this example, document manager 130 generates reference document 215d by determining the non-null values in log entry instance 1400, identifying semantic attribute names in configuration 900 that correspond to the identified non-null values in log entry instance 1400, and including the identified semantic attribute names in reference document 215d. As described above, document manager 130 does not include in a document certain semantic attribute names in configuration 900 even if a log entry instance has non-null values for those semantic attribute names. For this example, document manager 130 does not include the semantic attribute names EventLogType, EventSourceId, and EventSourceType in reference document 215d. As shown, document manager 130 includes in reference document 215d the following semantic attribute names associated with non-null values in log entry instance 1400: HeaderId, Timestamp, UserPseudonymInitiating, TechnicalLogEntryType, NetworkHostnameActor, ServiceInstanceName, Event, UserPseudonymTargeted, TechnicalTimestampOfInsertion, EventName, EventSeverityCode, and GenericAction. For this example, the value associated with GenericExplanation semantic attribute name in log entry instance 1400 is null. Thus, document manager 130 does not include values or partial values associated with this semantic attribute name in reference document 215d. As explained above, a document generated based on a log entry instance may be associated with the type of event with which the log entry instance is associated. As such, reference document 215d is associated with a failed user logon type of event since log entry instance 1400 is a log entry type associated with the failed user logon type of event.

Returning to FIG. 2, once document manager 130 retrieves reference documents 215 from reference documents storage 145, document manager 130 generates ranked list of types of events 220 based on document 210 and reference documents 215. Different embodiments employ different techniques for generating ranked list of types of events 220 based on document 210 and reference documents 215. For instance, in some embodiments, document manager 130 uses text mining techniques to determine similarities between document 210 and reference documents 215. Examples of such techniques include a k-nearest neighbors (k-NN) classification algorithm. The type of event associated with the most similar reference document 215 is the top-ranked type of event in ranked list of types of events 220, the type of event associated with the second-most similar reference document 215 is the second-ranked type of event in ranked list of types of events 220, the type of event associated with the third-most similar reference document 215 is the third-ranked type of event in ranked list of types of events 220, and so on and so forth. After generating ranked list of types of events 220, document manager 130 sends, at operation 265, it to log learning manager 125. When log learning manager 125 receives ranked list of types of events 220, log learning manager 125 present it via the GUI through which log learning manager 125 provides the tool for creating log entry type definitions. Log learning manager 125 then receives from the user of the tool a selection of a type of event from ranked list of types of events. Next, log learning manager 125 associates the selected type of event with the log entry type definition being created. Upon creating the log entry type definition, log learning manager 125 generates a set of rules for identifying log entry instances having the specified log entry type and stores the set of rule as part of the log entry type definition in log entry types storage 135 for use by processor 115 during the processing of log entry instances that log processor 115 receives from monitored sources 105a-105n.

Figure 16:
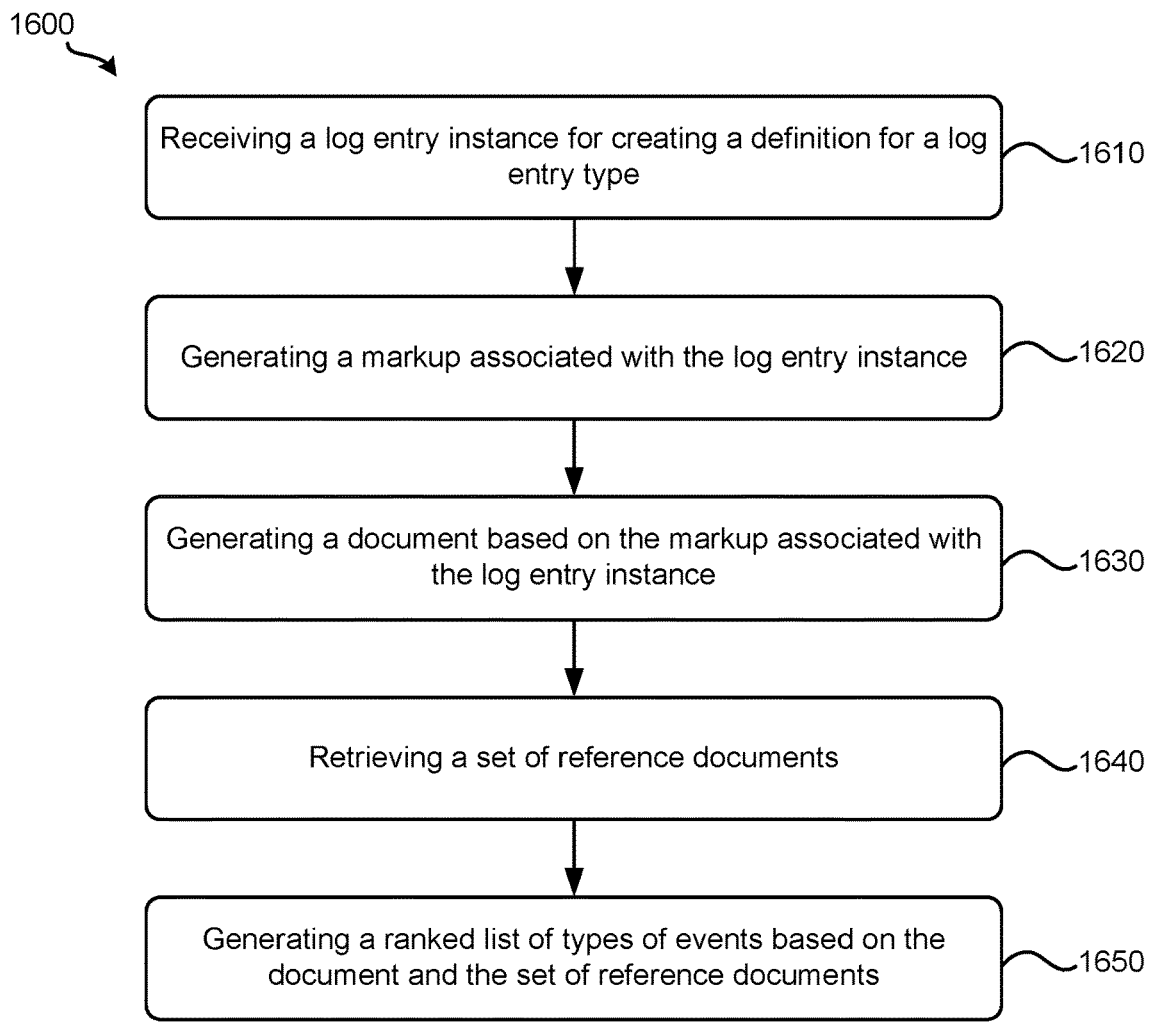
FIG. 16 illustrates a process for providing a ranked list of type of events according to some embodiments.

FIG. 16 illustrates a process 600 for providing a ranked list of type of events according to some embodiments. In some embodiments, security system 110 performs process 1600. Process 1600 starts by receiving, at 1610, a log entry instance for creating a definition for a log entry type. Referring to FIG. 2 as an example, log learning manager 125 may receive log entry instance 205 from a computing device of a user of security system 110 via a GUI through which log learning manager 125 provides the tool for creating log entry type definitions.

Next, process 1600 generates, at 1620, a markup associated with the log entry instance. As mentioned above, in some embodiments, a markup of a log entry instance is a genericized representation of the structure of the log entry instance. Referring to FIGS. 2, 3A, and 3B as an example, log learning manager 125 may receive log entry instance 300 and then generate markup 305 based on log entry instance 300.

Process 1600 then generates, at 1630, a document based on the markup associated with the log entry instance. In some embodiments, the document includes a set of semantic attribute names. In some such embodiments, process 1600 generates the document based on the markup associated with the log entry instance and a mapping between markup elements and semantic attribute names. Referring to FIGS. 2, 3B, 4 and 5 as an example, log learning manager 125 can generate document 210 by iterating through each of the markup elements in markup 305, identifying semantic attribute names mapped to each of the markup elements based on mappings 400, and including the identified semantic attribute names in document 210. Log learning manager 125 may additionally include in document 210 words in markup 305 that are not markup elements as well as a set of default words, as explained above.

Next, process 1600 retrieves, at 1640, a set of reference documents. Referring to FIG. 2 as an example, document manager 130 may retrieve a set of reference documents from reference documents storage 145. In some embodiments, the set of reference documents can include reference documents generated from definitions of types of events (e.g., reference document 215a) and/or reference documents generated from log entry instances (e.g., reference documents 215b-d). Finally, process 1600 generates, at 1650, a ranked list of types of events based on the document and the set of reference documents. Referring to FIG. 2 as an example, document manager 130 can generate ranked list of types of events 220 based on document 210 and reference documents 215.

Figure 17:
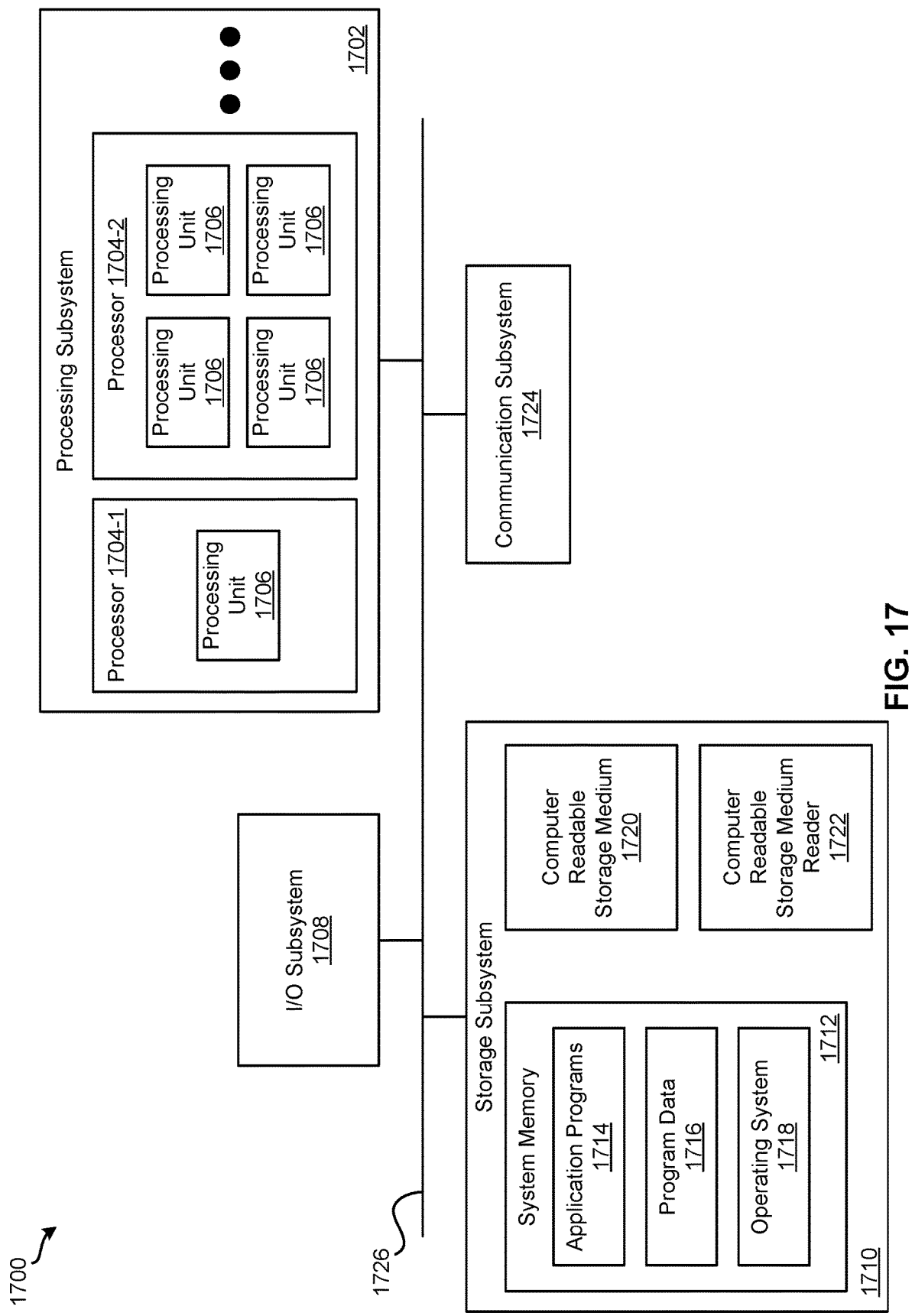
FIG. 17 illustrates an exemplary computer system, in which various embodiments may be implemented.

FIG. 17 illustrates an exemplary computer system 1700 for implementing various embodiments described above. For example, computer system 1700 may be used to implement monitored sources 105a-105n and security system 110. Computer system 1700 may be a desktop computer, a laptop, a server computer, or any other type of computer system or combination thereof. Some or all elements of log processor 115, log analyzer 120, log learning manager 125, and document manager 130, or combinations thereof can be included or implemented in computer system 1700. In addition, computer system 1700 can implement many of the operations, methods, and/or processes described above (e.g., process 1600). As shown in FIG. 17, computer system 1700 includes processing subsystem 1702, which communicates, via bus subsystem 1726, with input/output (I/O) subsystem 1708, storage subsystem 1710 and communication subsystem 1724.

Bus subsystem 1726 is configured to facilitate communication among the various components and subsystems of computer system 1700. While bus subsystem 1726 is illustrated in FIG. 17 as a single bus, one of ordinary skill in the art will understand that bus subsystem 1726 may be implemented as multiple buses. Bus subsystem 1726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1702, which can be implemented as one or more integrated circuits (e.g., a conventional microprocessor or microcontroller), controls the operation of computer system 1700. Processing subsystem 1702 may include one or more processors 1704. Each processor 1704 may include one processing unit 1706 (e.g., a single core processor such as processor 1704-1) or several processing units 1706 (e.g., a multicore processor such as processor 1704-2). In some embodiments, processors 1704 of processing subsystem 1702 may be implemented as independent processors while, in other embodiments, processors 1704 of processing subsystem 1702 may be implemented as multiple processors integrate into a single chip or multiple chips. Still, in some embodiments, processors 1704 of processing subsystem 1702 may be implemented as a combination of independent processors and multiple processors integrated into a single chip or multiple chips.

In some embodiments, processing subsystem 1702 can execute a variety of programs or processes in response to program code and can maintain multiple concurrently executing programs or processes. At any given time, some or all of the program code to be executed can reside in processing subsystem 1702 and/or in storage subsystem 1710. Through suitable programming, processing subsystem 1702 can provide various functionalities, such as the functionalities described above by reference to process 1600, etc.

I/O subsystem 1708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc.

Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1700 to a user or another device (e.g., a printer).

As illustrated in FIG. 17, storage subsystem 1710 includes system memory 1712, computer-readable storage medium 1720, and computer-readable storage medium reader 1722. System memory 1712 may be configured to store software in the form of program instructions that are loadable and executable by processing subsystem 1702 as well as data generated during the execution of program instructions. In some embodiments, system memory 1712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1712 may include different types of memory, such as static random access memory (SRAM) and/or dynamic random access memory (DRAM). System memory 1712 may include a basic input/output system (BIOS), in some embodiments, that is configured to store basic routines to facilitate transferring information between elements within computer system 1700 (e.g., during start-up). Such a BIOS may be stored in ROM (e.g., a ROM chip), flash memory, or any other type of memory that may be configured to store the BIOS.

As shown in FIG. 17, system memory 1712 includes application programs 1714, program data 1716, and operating system (OS) 1718. OS 1718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1720 may be a non-transitory computer-readable medium configured to store software (e.g., programs, code modules, data constructs, instructions, etc.). Many of the components (e.g., log processor 115, log analyzer 120, log learning manager 125, and document manager 130) and/or processes (e.g., process 1600) described above may be implemented as software that when executed by a processor or processing unit (e.g., a processor or processing unit of processing subsystem 1702) performs the operations of such components and/or processes. Storage subsystem 1710 may also store data used for, or generated during, the execution of the software.

Storage subsystem 1710 may also include computer-readable storage medium reader 1722 that is configured to communicate with computer-readable storage medium 1720. Together and, optionally, in combination with system memory 1712, computer-readable storage medium 1720 may comprehensively represent remote, local, fixed, and/or removable storage devices plus storage media for temporarily and/or more permanently containing, storing, transmitting, and retrieving computer-readable information.

Computer-readable storage medium 1720 may be any appropriate media known or used in the art, including storage media such as volatile, non-volatile, removable, non-removable media implemented in any method or technology for storage and/or transmission of information.

Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1724 serves as an interface for receiving data from, and transmitting data to, other devices, computer systems, and networks. For example, communication subsystem 1724 may allow computer system 1700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1724 may provide components configured for wired communication (e.g., Ethernet) in addition to or instead of components configured for wireless communication.

One of ordinary skill in the art will realize that the architecture shown in FIG. 17 is only an example architecture of computer system 1700, and that computer system 1700 may have additional or fewer components than shown, or a different configuration of components. The various components shown in FIG. 17 may be implemented in hardware, software, firmware or any combination thereof, including one or more signal processing and/or application specific integrated circuits.

Figure 18:
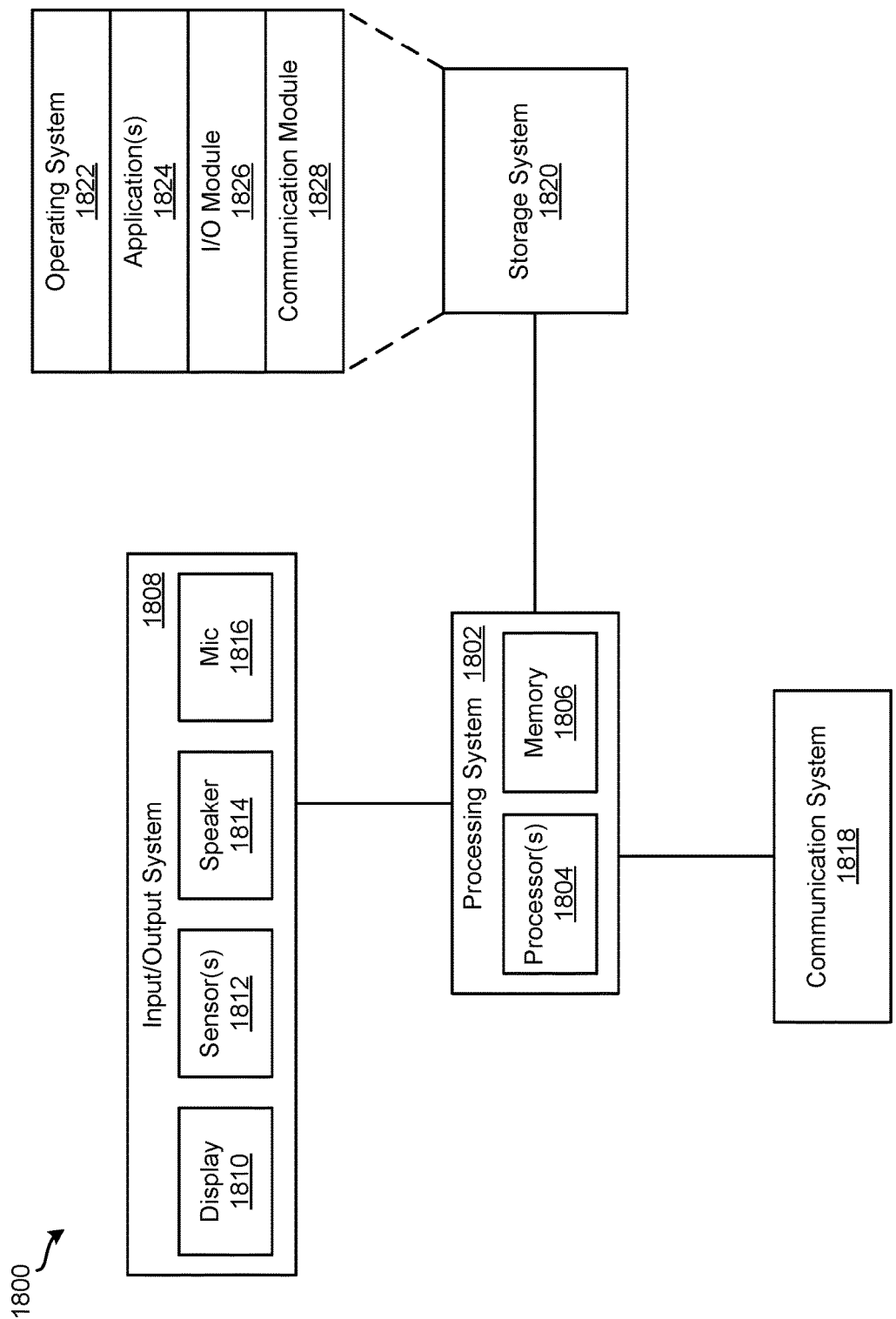
FIG. 18 illustrates an exemplary computing device, in which various embodiments may be implemented.

FIG. 18 illustrates an exemplary computing device 1800 for implementing various embodiments described above. For example, computing device 1800 may be used to implement monitored sources 105*a*-105*n*. Computing device 1800 may be a cellphone, a smartphone, a wearable device, an activity tracker or manager, a tablet, a personal digital assistant (PDA), a media player, or any other type of mobile computing device or combination thereof. As shown in FIG. 18, computing device 1800 includes processing system 1802, input/output (I/O) system 1808, communication system 1818, and storage system 1820. These components may be coupled by one or more communication buses or signal lines.

Processing system 1802, which can be implemented as one or more integrated circuits (e.g., a conventional microprocessor or microcontroller), controls the operation of computing device 1800. As shown, processing system 1802 includes one or more processors 1804 and memory 1806. Processors 1804 are configured to run or execute various software and/or sets of instructions stored in memory 1806 to perform various functions for computing device 1800 and to process data.

Each processor of processors 1804 may include one processing unit (e.g., a single core processor) or several processing units (e.g., a multicore processor). In some embodiments, processors 1804 of processing system 1802 may be implemented as independent processors while, in other embodiments, processors 1804 of processing system 1802 may be implemented as multiple processors integrate into a single chip. Still, in some embodiments, processors 1804 of processing system 1802 may be implemented as a combination of independent processors and multiple processors integrated into a single chip.

Memory 1806 may be configured to receive and store software (e.g., operating system 1822, applications 1824, I/O module 1826, communication module 1828, etc. from storage system 1820) in the form of program instructions that are loadable and executable by processors 1804 as well as data generated during the execution of program instructions. In some embodiments, memory 1806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1808 is responsible for receiving input through various components and providing output through various components. As shown for this example, I/O system 1808 includes display 1810, one or more sensors 1812, speaker 1814, and microphone 1816. Display 1810 is configured to output visual information (e.g., a graphical user interface (GUI) generated and/or rendered by processors 1804). In some embodiments, display 1810 is a touch screen that is configured to also receive touch-based input. Display 1810 may be implemented using liquid crystal display (LCD) technology, light-emitting diode (LED) technology, organic LED (OLED) technology, organic electro luminescence (OEL) technology, or any other type of display technologies. Sensors 1812 may include any number of different types of sensors for measuring a physical quantity (e.g., temperature, force, pressure, acceleration, orientation, light, radiation, etc.). Speaker 1814 is configured to output audio information and microphone 1816 is configured to receive audio input. One of ordinary skill in the art will appreciate that I/O system 1808 may include any number of additional, fewer, and/or different components. For instance, I/O system 1808 may include a keypad or keyboard for receiving input, a port for transmitting data, receiving data and/or power, and/or communicating with another device or component, an image capture component for capturing photos and/or videos, etc.

Communication system 1818 serves as an interface for receiving data from, and transmitting data to, other devices, computer systems, and networks. For example, communication system 1818 may allow computing device 1800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1818 may provide components configured for wired communication (e.g., Ethernet) in addition to or instead of components configured for wireless communication.

Storage system 1820 handles the storage and management of data for computing device 1800. Storage system 1820 may be implemented by one or more non-transitory machine-readable mediums that are configured to store software (e.g., programs, code modules, data constructs, instructions, etc.) and store data used for, or generated during, the execution of the software.

In this example, storage system 1820 includes operating system 1822, one or more applications 1824, I/O module 1826, and communication module 1828. Operating system 1822 includes various procedures, sets of instructions, software components and/or drivers for controlling and managing general system tasks (e.g., memory management, storage device control, power management, etc.) and facilitates communication between various hardware and software components. Operating system 1822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1824 can include any number of different applications installed on computing device 1800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1826 manages information received via input components (e.g., display 1810, sensors 1812, and microphone 1816) and information to be outputted via output components (e.g., display 1810 and speaker 1814). Communication module 1828 facilitates communication with other devices via communication system 1818 and includes various software components for handling data received from communication system 1818.

One of ordinary skill in the art will realize that the architecture shown in FIG. 18 is only an example architecture of computing device 1800, and that computing device 1800 may have additional or fewer components than shown, or a different configuration of components. The various components shown in FIG. 18 may be implemented in hardware, software, firmware or any combination thereof, including one or more signal processing and/or application specific integrated circuits.

Figure 19:
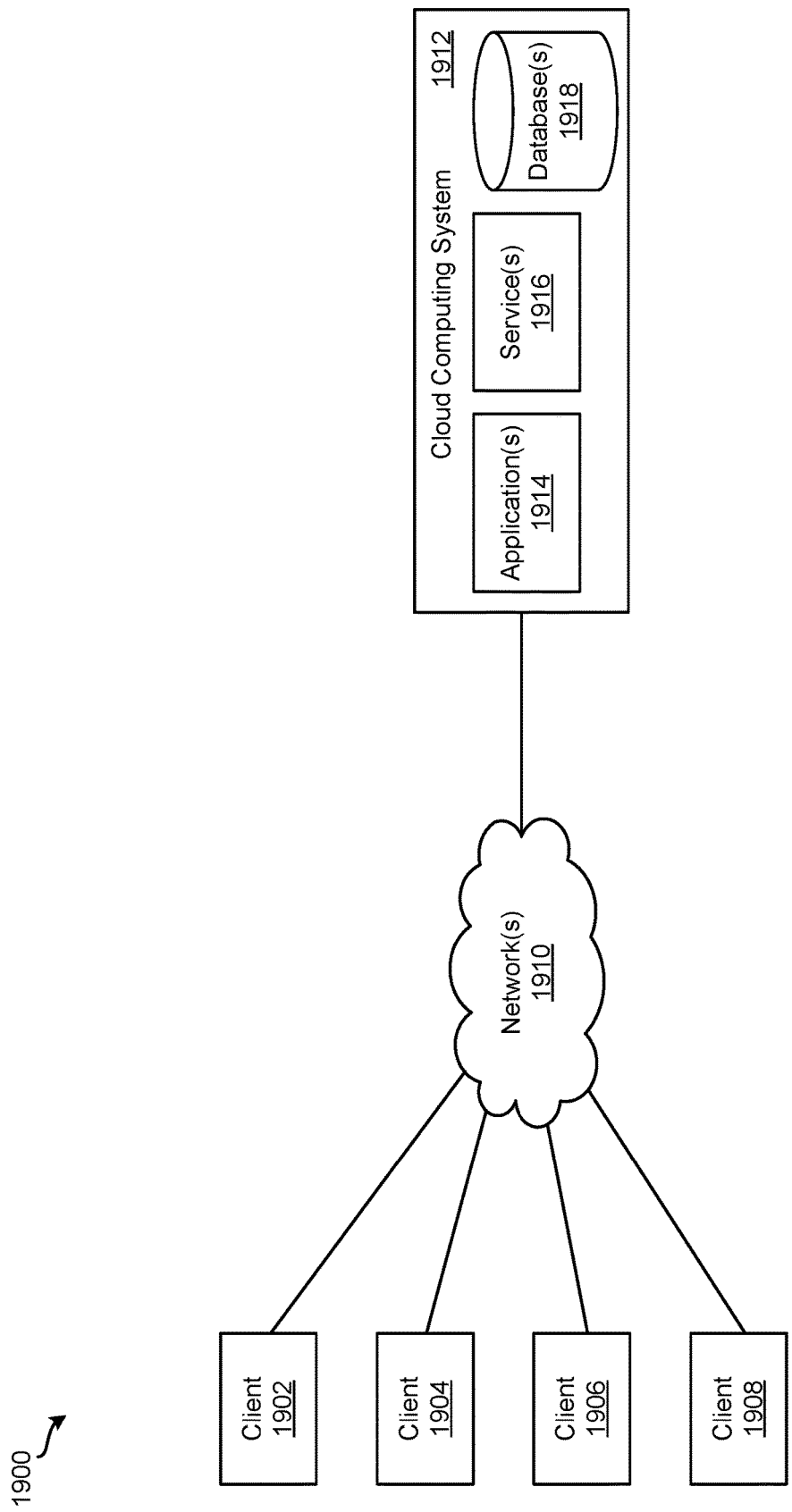
FIG. 19 illustrates system for implementing various embodiments described above.

FIG. 19 illustrates an exemplary system 1900 for implementing various embodiments described above. For example, cloud computing system 1912 of system 1900 may be used to implement security system 110 and client devices 1902-1908 may be used to implement monitored sources 105a-105n. As shown, system 1900 includes client devices 1902-1908, one or more networks 1910, and cloud computing system 1912. Cloud computing system 1912 is configured to provide resources and data to client devices 1902-1908 via networks 1910. In some embodiments, cloud computing system 1900 provides resources to any number of different users (e.g., customers, tenants, organizations, etc.). Cloud computing system 1912 may be implemented by one or more computer systems (e.g., servers), virtual machines operating on a computer system, or a combination thereof.

As shown, cloud computing system 1912 includes one or more applications 1914, one or more services 1916, and one or more databases 1918. Cloud computing system 1900 may provide applications 1914, services 1916, and databases 1918 to any number of different customers in a self-service, subscription-based, elastically scalable, reliable, highly available, and secure manner.

In some embodiments, cloud computing system 1900 may be adapted to automatically provision, manage, and track a customer's subscriptions to services offered by cloud computing system 1900. Cloud computing system 1900 may provide cloud services via different deployment models. For example, cloud services may be provided under a public cloud model in which cloud computing system 1900 is owned by an organization selling cloud services and the cloud services are made available to the general public or different industry enterprises. As another example, cloud services may be provided under a private cloud model in which cloud computing system 1900 is operated solely for a single organization and may provide cloud services for one or more entities within the organization. The cloud services may also be provided under a community cloud model in which cloud computing system 1900 and the cloud services provided by cloud computing system 1900 are shared by several organizations in a related community. The cloud services may also be provided under a hybrid cloud model, which is a combination of two or more of the aforementioned different models.

In some instances, any one of applications 1914, services 1916, and databases 1918 made available to client devices 1902-1908 via networks 1910 from cloud computing system 1900 is referred to as a "cloud service." Typically, servers and systems that make up cloud computing system 1900 are different from the on-premises servers and systems of a customer. For example, cloud computing system 1900 may host an application and a user of one of client devices 1902-1908 may order and use the application via networks 1910.

Applications 1914 may include software applications that are configured to execute on cloud computing system 1912 (e.g., a computer system or a virtual machine operating on a computer system) and be accessed, controlled, managed, etc. via client devices 1902-1908. In some embodiments, applications 1914 may include server applications and/or mid-tier applications (e.g., HTTP (hypertext transport protocol) server applications, FTP (file transfer protocol) server applications, CGI (common gateway interface) server applications, JAVA server applications, etc.). Services 1916 are software components, modules, application, etc. that are configured to execute on cloud computing system 1912 and provide functionalities to client devices 1902-1908 via networks 1910. Services 1916 may be web-based services or on-demand cloud services.

Databases 1918 are configured to store and/or manage data that is accessed by applications 1914, services 1916, and/or client devices 1902-1908. For instance, storages 135-145 may be stored in databases 1918. Databases 1918 may reside on a non-transitory storage medium local to (and/or resident in) cloud computing system 1912, in a storage-area network (SAN), on a non-transitory storage medium local located remotely from cloud computing system 1912. In some embodiments, databases 1918 may include relational databases that are managed by a relational database management system (RDBMS). Databases 1918 may be a column-oriented databases, row-oriented databases, or a combination thereof. In some embodiments, some or all of databases 1918 are in-memory databases. That is, in some such embodiments, data for databases 1918 are stored and managed in memory (e.g., random access memory (RAM)).

Client devices 1902-1908 are configured to execute and operate a client application (e.g., a web browser, a proprietary client application, etc.) that communicates with applications 1914, services 1916, and/or databases 1918 via networks 1910. This way, client devices 1902-1908 may access the various functionalities provided by applications 1914, services 1916, and databases 1918 while applications 1914, services 1916, and databases 1918 are operating (e.g., hosted) on cloud computing system 1900. Client devices 1902-1908 may be computer system 1700 or computing device 1800, as described above by reference to FIGS. 17 and 18, respectively. Although system 1900 is shown with four client devices, any number of client devices may be supported.

Networks 1910 may be any type of network configured to facilitate data communications among client devices 1902-1908 and cloud computing system 1912 using any of a variety of network protocols. Networks 1910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:
  receiving a log entry instance for creating a definition for a log entry type;
  generating a markup associated with the log entry instance;
  generating a document based on the markup associated with the log entry instance;
  retrieving a set of reference documents, each reference document associated with a particular type of event;
  generating a ranked list of types of events based on the document and the set of reference documents;
  configuring for presentation the ranked list of types of events and receiving a selection of a type of event from the ranked list of types of events; and
  creating the definition for the log entry type by associating the selected type of event with the log entry instance, wherein the definition of the log entry type includes one or more rules for associating additional log entry instances with the log entry type.

2. The non-transitory machine-readable medium of claim 1, wherein the log entry instance is a first log entry instance, wherein the program further comprises sets of instructions for:
  receiving a second log entry instance from a monitored source; and processing the second log entry instance based on the definition for the log entry type in order to determine whether the second log entry instance is a log entry instance having the log entry type.

3. The non-transitory machine-readable medium of claim 1, wherein the program further comprises sets of instructions for generating a subset of the set of reference documents based on a set of definitions of types of events.

4. The non-transitory machine-readable medium of claim 1, wherein the program further comprises sets of instructions for generating a subset of the set of reference documents based on a set of log entry instances.

5. The non-transitory machine-readable medium of claim 1, wherein the markup associated with the log entry instance comprises a set of markup elements, wherein the document comprises a set of semantic attribute names, wherein generating the document based on the markup associated with the log entry instance comprises identifying the set of semantic attribute names based on a mapping between a plurality of markup elements and a plurality of semantic attribute names.

6. The non-transitory machine-readable medium of claim 1, wherein generating a ranked list of types of events based on the document and the set of reference documents comprises determining similarities between the document and each of the reference documents in the set of reference documents.

7. A method comprising:
receiving, by a computing device, a log entry instance for creating a definition for a log entry type;
generating, by the computing device, a markup associated with the log entry instance;
generating, by the computing device, a document based on the markup associated with the log entry instance;
retrieving, by the computing device, a set of reference documents, each reference document associated with a particular type of event;
generating, by the computing device, a ranked list of types of events based on the document and the set of reference documents;
configuring for presentation, by the computing device, the ranked list of types of events and receiving a selection of a type of event from the ranked list of types of events; and
creating, by the computing device, the definition for the log entry type by associating the selected type of event with the log entry instance, wherein the definition of the log entry type includes one or more rules for associating additional log entry instances with the log entry type.

8. The method of claim 7, wherein the log entry instance is a first log entry instance, wherein the method further comprises:
receiving a second log entry instance from a monitored source; and
processing the second log entry instance based on the definition for the log entry type in order to determine whether the second log entry instance is a log entry instance having the log entry type.

9. The method of claim 7 further comprising generating a subset of the set of reference documents based on a set of definitions of types of events.

10. The method of claim 7 further comprising generating a subset of the set of reference documents based on a set of log entry instances.

11. The method of claim 7, wherein the markup associated with the log entry instance comprises a set of markup elements, wherein the document comprises a set of semantic attribute names, wherein generating the document based on the markup associated with the log entry instance comprises identifying the set of semantic attribute names based on a mapping between a plurality of markup elements and a plurality of semantic attribute names.

12. The method of claim 7, wherein generating a ranked list of types of events based on the document and the set of reference documents comprises determining similarities between the document and each of the reference documents in the set of reference documents.

13. A system comprising:
a set of processing units; and
a non-transitory computer-readable medium storing instructions that when executed by at least one processing unit in the set of processing units cause the at least one processing unit to:
receive a log entry instance for creating a definition for a log entry type;
generate a markup associated with the log entry instance;
generate a document based on the markup associated with the log entry instance;
retrieve a set of reference documents, each reference document associated with a particular type of event;
generate a ranked list of types of events based on the document and the set of reference documents;
present the ranked list of types of events and receive a selection of a type of event from the ranked list of types of events; and
create the definition for the log entry type by associating the selected type of event with the log entry instance, wherein the definition of the log entry type includes one or more rules for associating additional log entry instances with the log entry type.

14. The system of claim 13, wherein the log entry instance is a first log entry instance, wherein the instructions further cause the at least one processing unit to:
receive a second log entry instance from a monitored source; and
process the second log entry instance based on the definition for the log entry type in order to determine whether the second log entry instance is a log entry instance having the log entry type.

15. The system of claim 13, wherein the instructions further cause the at least one processing unit to generate a subset of the set of reference documents based on a set of definitions of types of events.

16. The system of claim 13, wherein the instructions further cause the at least one processing unit to generate a subset of the set of reference documents based on a set of log entry instances.

17. The system of claim 13, wherein the markup associated with the log entry instance comprises a set of markup elements, wherein the document comprises a set of semantic attribute names, wherein generating the document based on the markup associated with the log entry instance comprises identifying the set of semantic attribute names based on a mapping between a plurality of markup elements and a plurality of semantic attribute names.

* * * * *